(12) United States Patent
Miller (10) Patent No.: US 7,290,904 B2
(45) Date of Patent: Nov. 6, 2007

(54) LIGHT WITH SUPPORT FLANGE

(76) Inventor: Randy George Miller, 291 Bost Dr., West Mifflin, PA (US) 15122

(*) Notice: Subject to any disclaimer, the term of this patent is extended or adjusted under 35 U.S.C. 154(b) by 0 days.

(21) Appl. No.: 11/273,974

(22) Filed: Nov. 15, 2005

(65) Prior Publication Data
US 2006/0114680 A1 Jun. 1, 2006

Related U.S. Application Data

(60) Provisional application No. 60/631,322, filed on Nov. 29, 2004.

(51) Int. Cl.
*F21V 21/108* (2006.01)
(52) U.S. Cl. ........................ 362/432; 362/370
(58) Field of Classification Search ............... 362/370, 362/432, 431, 382, 457; 248/300
See application file for complete search history.

(56) References Cited

U.S. PATENT DOCUMENTS

| | | | |
|---|---|---|---|
| D271,045 S | 10/1983 | Tamblyn | |
| 4,533,983 A * | 8/1985 | Hafstad | 362/223 |
| D281,725 S | 12/1985 | Schreiner | |
| 4,747,025 A * | 5/1988 | Barton | 362/147 |
| 4,994,943 A * | 2/1991 | Aspenwall | 362/219 |
| D318,536 S | 7/1991 | Jones et al. | |
| 5,204,586 A | 4/1993 | Moore | |
| 5,448,463 A | 9/1995 | Leen | |
| 5,570,000 A | 10/1996 | Kowalski | |
| D378,143 S | 2/1997 | Kollins | |
| 5,730,522 A * | 3/1998 | Wyke et al. | 362/432 |
| 5,943,827 A | 8/1999 | Okerlund | |
| 5,984,486 A * | 11/1999 | Munz et al. | 362/33 |
| 6,343,788 B1 * | 2/2002 | Rosenberg et al. | 273/153 S |
| 6,817,731 B2 | 11/2004 | Tufte | |
| 7,097,319 B2 * | 8/2006 | Mauk et al. | 362/147 |
| 2002/0105794 A1 | 8/2002 | Hanscom et al. | |

* cited by examiner

*Primary Examiner*—Alan Cariaso
*Assistant Examiner*—Leah S. Lovell
(74) *Attorney, Agent, or Firm*—The Webb Law Firm (57) ABSTRACT

The present invention is directed to a lighting system including a light fixture with a bracket attached thereto and an elongated flange comprising a body portion and a coupling member extending from the body portion. The coupling member is adapted to interact with the bracket to secure the light fixture to the flange. The present invention is also a method of installing a lighting system including the steps of: providing a light fixture with a bracket attached thereto; providing an elongated flange including a body portion, a coupling member configured to mate with the bracket of the light fixture extending from the body portion and a stop member extending substantially perpendicular to the body portion; forcing the elongated flange into a structure until the stop member is in contact with the structure; and securing the light fixture to the elongated flange by mating the bracket with the coupling member.

8 Claims, 12 Drawing Sheets

LIGHT WITH SUPPORT FLANGE

CROSS REFERENCE TO RELATED APPLICATIONS

This application claims the benefit of U.S. Provisional Patent Application No. 60/631,322, filed Nov. 29, 2004, entitled "Light with Support Flange", the disclosure of which is hereby incorporated by reference.

BACKGROUND OF THE INVENTION

1. Field of the Invention

The present invention relates, in general, to a lighting fixture and, more particularly, to a lighting fixture with a support means.

2. Description of Related Art

Landscape lighting systems are currently used to provide safely lit walking paths or driveways, while also providing light to landscape designs for visualization during night time hours. Present landscape lighting systems typically include light housings mounted on or within posts. These posts are usually low to the ground and placed along walking paths, driveways, retaining walls, or other landscaping structures.

U.S. Pat. No. 5,943,827 discloses a block assembly for use in retaining wall systems. The block assembly includes a body with a formed recess for accepting a lighting fixture. A lighting fixture may be positioned within the recess and coupled to a power source. While this block assembly solves the problem of adding lighting fixtures to a new retaining wall, it does not address the need for adding lighting fixtures to pre-existing retaining walls.

Accordingly, a need exists for a lighting fixture that can be easily and inexpensively incorporated into existing retaining walls, landscape features and other structures.

SUMMARY OF THE INVENTION

The present invention is directed to a lighting system. The lighting system includes a light fixture with a bracket attached thereto and an elongated flange comprising a body portion and a coupling member extending from the body portion. The coupling member is adapted to interact with the bracket to secure the light fixture to the flange.

The elongated flange may further include a stop member extending substantially perpendicular to the body portion and opposite to the coupling member. The body portion of the elongated flange may be substantially flat and include a plurality of holes therein. The elongated flange may further include a thin-channel for housing and protecting electrical wires.

The light fixture may either be fixedly or removably attached to the elongated flange. The light fixture may also have an elongated, hexagonal shape, and may be powered by solar cells, electricity, batteries or any combination thereof.

The present invention is further directed to a lighting system including a light fixture including a front portion and a rear portion and an elongated flange including a body portion with a first end and a second end. The first end of the body portion of the elongated flange may be secured to the rear portion of the light fixture. The first end of the body portion of the elongated flange may also include a coupling member extending substantially perpendicular to the body portion. The coupling member is adapted to interact with the light fixture thereby securing the light fixture to the elongated flange. The body portion of the elongated flange may further be configured to include an elongated channel between the first end and the second end that is adapted to receive an extension member. The coupling member may also include a channel adapted to receive the extension member. The extension member includes a body portion with a channel formed therein and a securing member adapted to interact with the light fixture. The extension member may be secured either the body portion of the elongated flange or the coupling member using a nut and bolt. Translucent strips, opaque strips, reflective strips or any combination thereof may be secured to an inside portion of the light fixture to alter an appearance or color of light transmitted therefrom.

The present invention is also a method of installing a lighting system. The method includes the steps of: providing a light fixture with a bracket attached thereto; providing an elongated flange including a body portion, a coupling member configured to mate with the bracket of the light fixture extending from the body portion and a stop member extending substantially perpendicular to the body portion; forcing the elongated flange into a structure until the stop member is in contact with the structure; and securing the light fixture to the elongated flange by mating the bracket with the coupling member.

These and other features and characteristics of the present invention will become more apparent upon consideration of the following detailed description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

DETAILED DESCRIPTION OF THE PRESENT INVENTION

For purposes of the description hereinafter, the terms "upper", "lower", "right", "left", "vertical", "horizontal", "top", "bottom", "lateral", "longitudinal" and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

Figure 1:
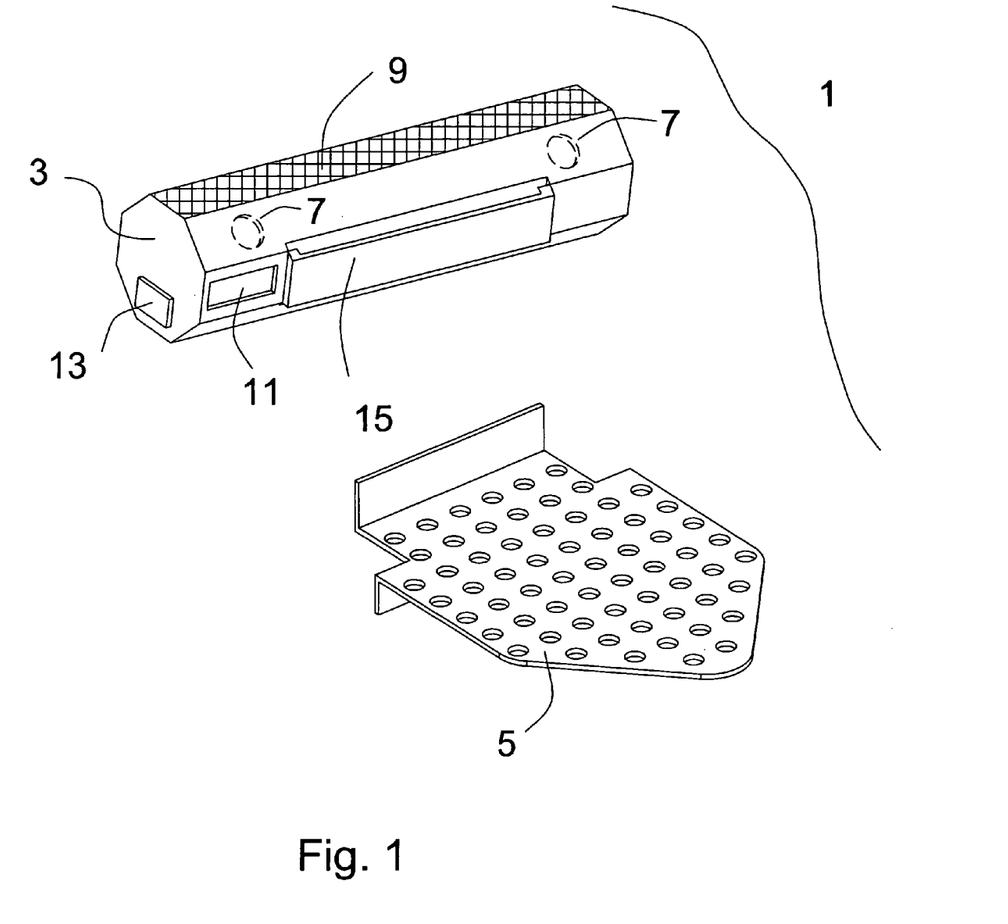
FIG. 1 is an exploded perspective view of a lighting system in accordance with the present invention.
Figure 2:
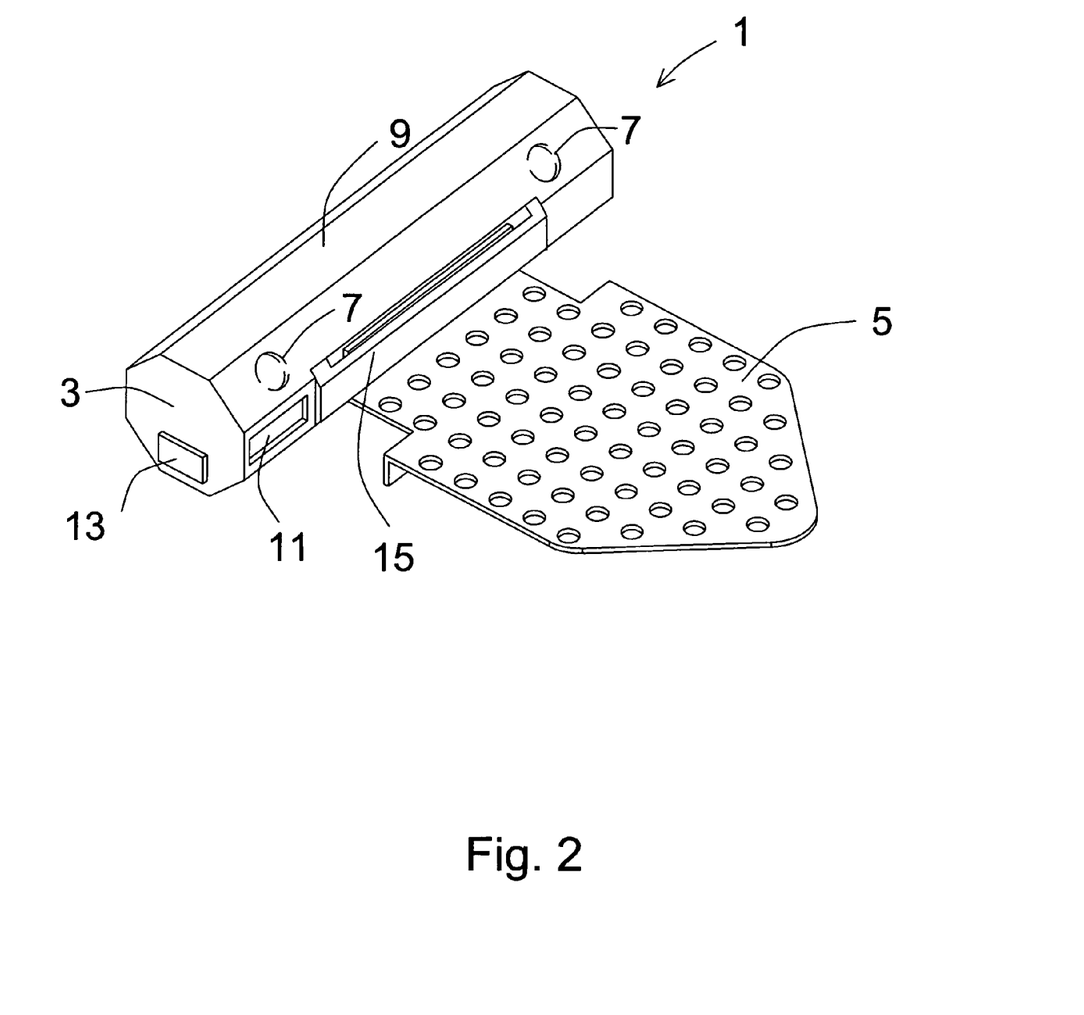
FIG. 2 is an assembled perspective view of the lighting system of FIG. 1.
Figure 3:
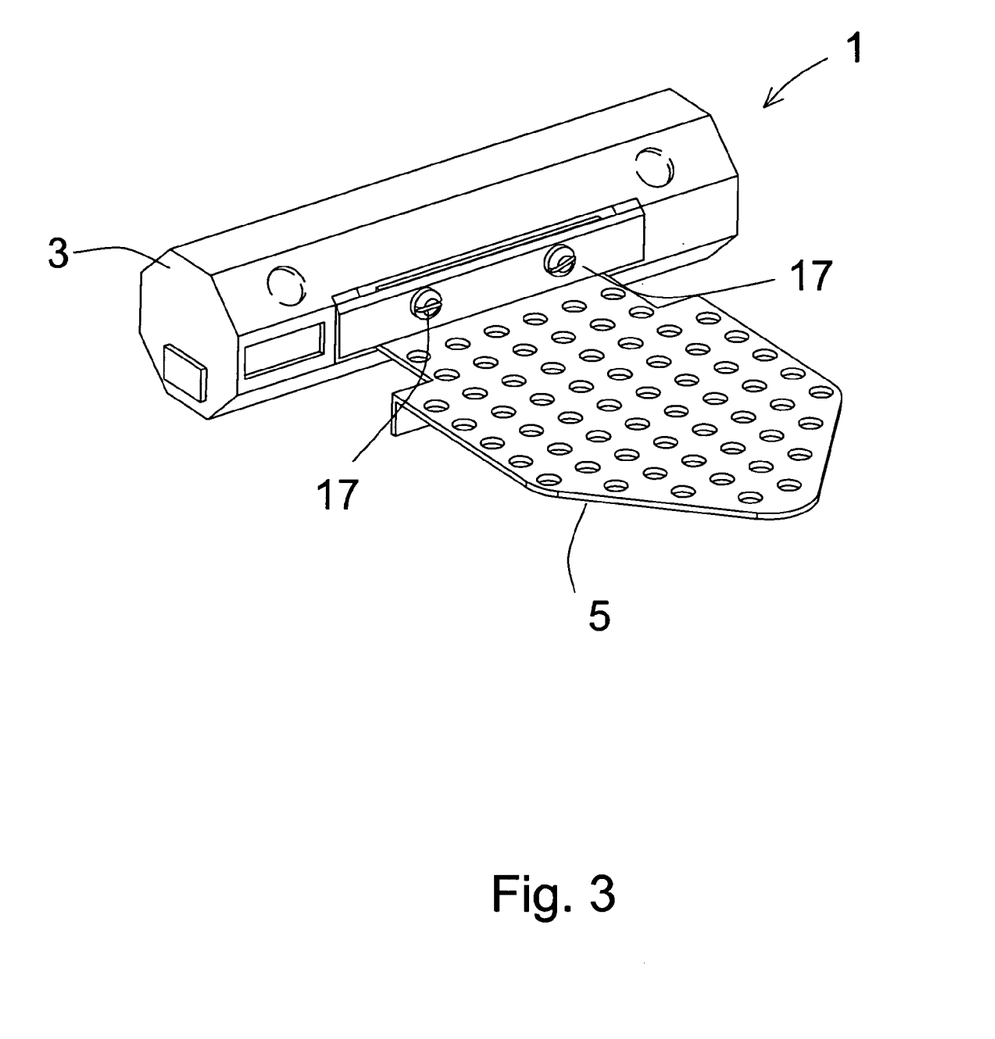
FIG. 3 is an assembled perspective view of a lighting system with a light fixture fixedly attached to an elongated flange in accordance with the present invention.

With reference to FIGS. 1 and 2, lighting system 1 includes a light fixture 3 and an elongated flange 5. Light fixture 3 and elongated flange 5 may be constructed from plastic, rubber, metal, plexiglass, translucent plastic, or some other weather-resistant material. Light fixture 3 includes at least one light source 7, a solar panel 9, rechargeable batteries 11, and an on-off sensor 13. Light source 7 can include, but is not limited to, a conventional light bulb of any size, shape or color, halogen bulbs, fluorescent bulbs and light-emitting diodes. Light fixture 3 further includes a bracket 15 attached thereto. Bracket 15 is utilized to secure light fixture 3 to elongated flange 5. The use of bracket 15 allows for easy removal and positioning of light fixture 3 relative to elongated flange 5. However, light fixture 3 may also be fixedly attached to elongated flange 5 through the use of bolts 17 as shown in FIG. 3, the use of a lock-in channel and tab combination or the like. Light fixture 3 and elongated flange 5 may also be integrally molded from a single piece of material.

Figure 4A:
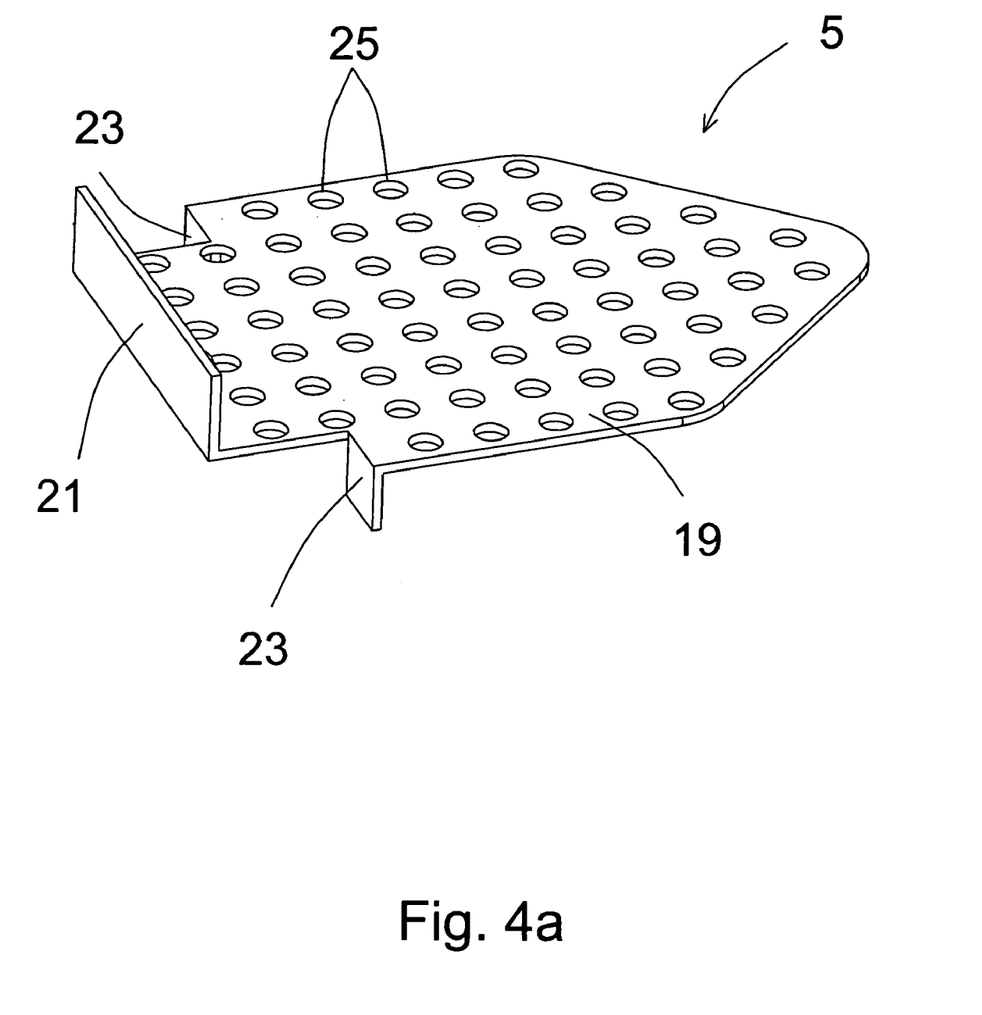
FIGS. 4a-4c are a perspective view, a side plan view and a front plan view, respectively, of an elongated flange of the lighting system in accordance with the present invention.
Figure 4B:
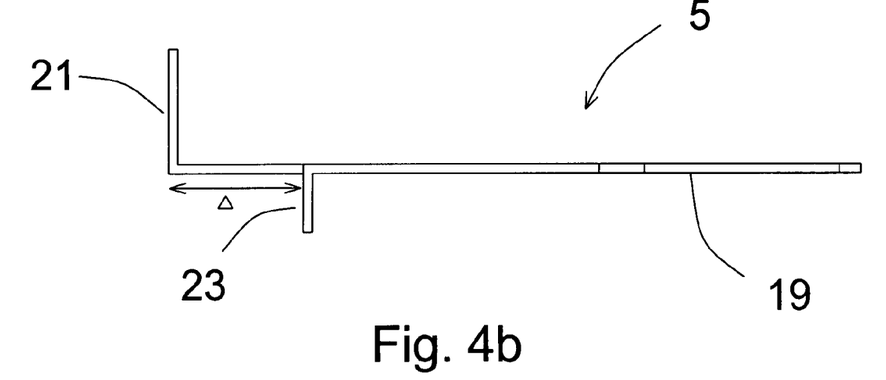
Figure 4C:
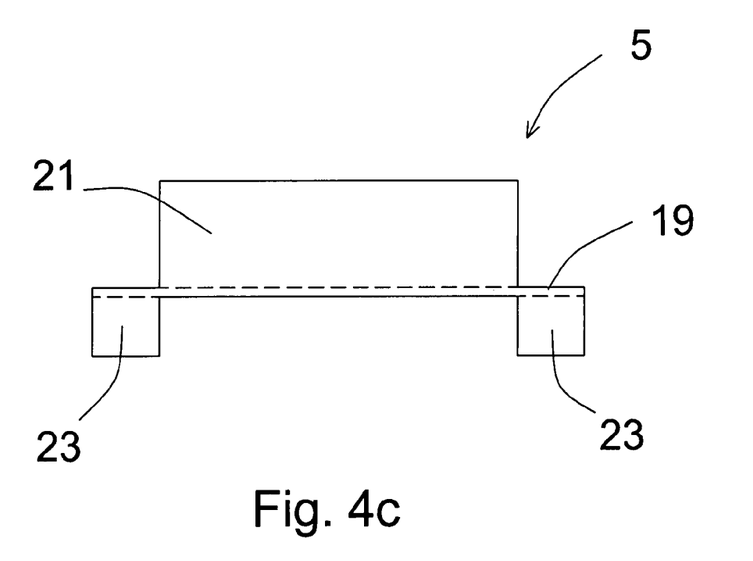

With reference to FIGS. 4a-4c, and with continuing reference to FIGS. 1 and 2, elongated flange 5 includes a body portion 19, a coupling member 21 and at least one stop member 23. Coupling member 21 extends substantially perpendicular to body portion 19 and is designed to secure light fixture 3 to elongated flange 5 by interacting with bracket 15. Stop member 23 also extends substantially perpendicular to body portion 19, but in a direction opposite to coupling member 21. Stop member 19 is designed to provide an indication of when elongated flange 5 has been sufficiently positioned within a structure, such as a retaining wall, to support light fixture 3. A gap A exists between coupling member 21 and stop member 23. Gap A allows sufficient space for bracket 15 of light fixture 3 to be secured to coupling member 21. Body portion 19 may also include a plurality of holes 25. Holes 25 relieve friction and collect loose fragments of material as elongated flange 5 is installed within a structure. Body portion 19 of elongated flange 5 may be any suitable shape, such as, but not limited to, a triangle, rectangle, square or the like. An advantage of the present invention is that there is no need to anchor lighting system 1. The weight of the structure in which elongated flange 5 is positioned provides the needed support for light fixture 3. However, if additional support is required or if no supporting structure is present, holes 25 allow elongated flange 5 to be secured to the structure using nails, screws or the like. Elongated flange 5 may also be secured to a structure using glue, caulking or any other suitable adhesive.

Figure 5A:
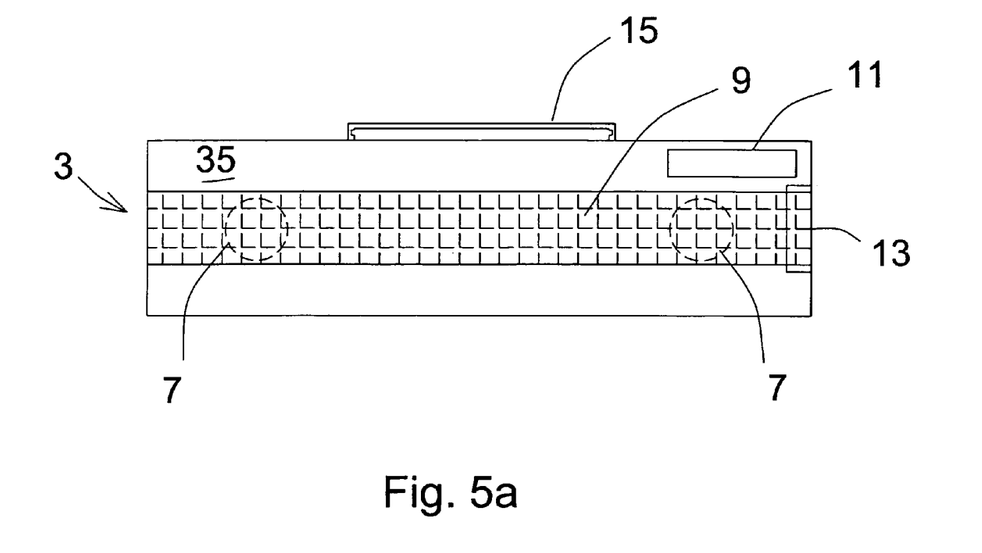
FIGS. 5a-5c are a top plan view, a right end view and a left end view, respectively of a light fixture of the lighting system in accordance with the present invention.
Figure 5B:
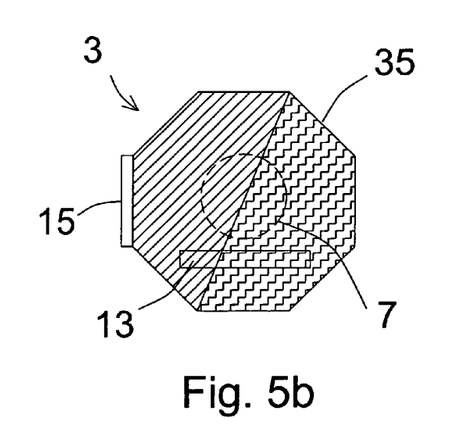
Figure 5C:
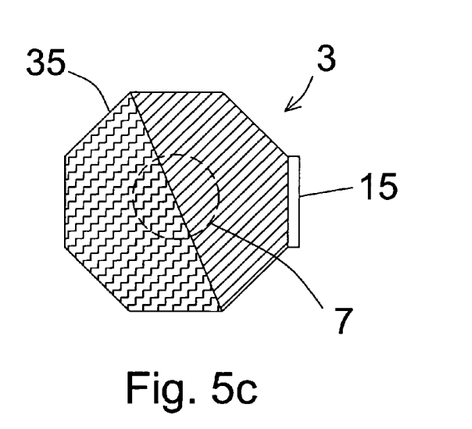

With reference to FIGS. 5a-5c, and with continuing reference to FIGS. 1 and 2, light fixture 1 includes a housing 35 of a generally elongated, hexagonal shape. Housing 35 encloses light source 7, batteries 11 and on-off sensor 13. Housing 35 further includes a solar panel or panels 9 secured to a top portion thereof. Solar panel or panels 9 are configured to recharge batteries 11, which provide power to light source 7. Housing 35 may be of a one- or multiple-piece construction. If a multiple-piece construction is utilized, a gasket (not shown) may be incorporated into the design to provide protection to the elements inside of housing 35 from the weather. The advantage of using a multiple-piece construction for light fixture 1 is that light source 1 can be easily opened allowing the user to replace, change or adjust the position of light source 7. Translucent or opaque strips may also be provided and positioned on the inside of housing 35. Such strips can be configured to direct light in a desired direction or change the intensity of the light. These strips may further be colored. This allows the system to provide decorative lighting during the holiday seasons. This effect can also be produced using light bulbs or light emitting diodes having different colors.

While light fixture 3 has been described hereinabove as a hexagonal shaped light, this is not to be construed as limiting the present invention as a variety of different shaped light fixtures have been envisioned. Such different shapes allow lighting system 1 to fit neatly within different types of materials used to build walls and other types of landscaping structures.

Figure 6A:
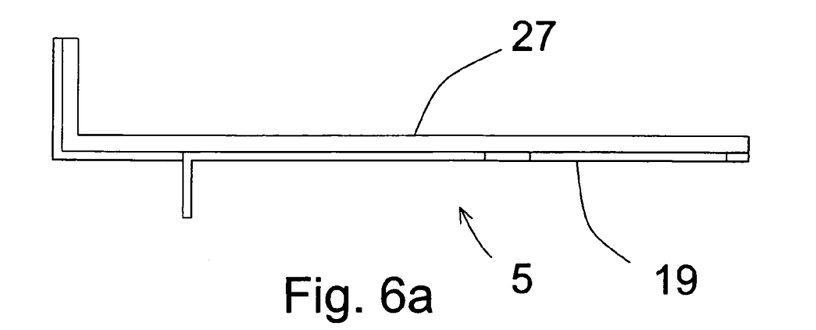
FIGS. 6a and 6b are a side plan view and rear plan view, respectively, of the elongated flange for use with an electric-powered light in accordance with the present invention.
Figure 6B:
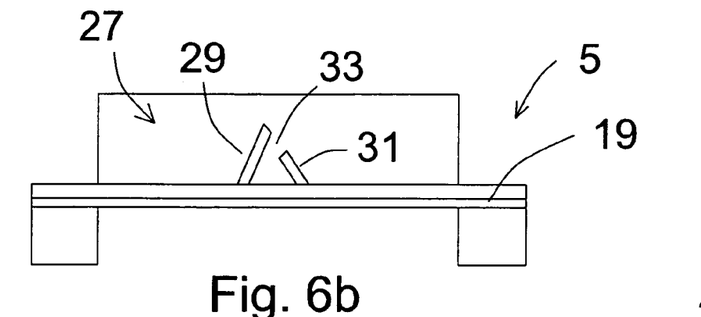

With reference to FIGS. 6a and 6b, an electric-powered version of lighting system 1 includes a light fixture 3 and support flange 5, as shown in FIGS. 1 and 2. The electric powered version further includes a thin-channel 27 formed on top of the body portion 19 of support flange 5 for housing a wire (not shown) that is used to supply light fixture 3 with power. Thin-channel 27 also protects the wire when lighting system 1 is positioned in a structure, such as a retaining wall. Thin-channel 27 includes a first flange 29 and a second flange 31 forming an opening 33. A wire is positioned in opening 33 and is protected by first flange 29 and second flange 31 while lighting system 1 positioned within a structure. While light fixture 3 has been described hereinabove as being either solar or electric powered, this is not to be construed as limiting as other power sources, such as batteries, have been envisioned as viable power sources for light fixture 3.

Figure 6C:
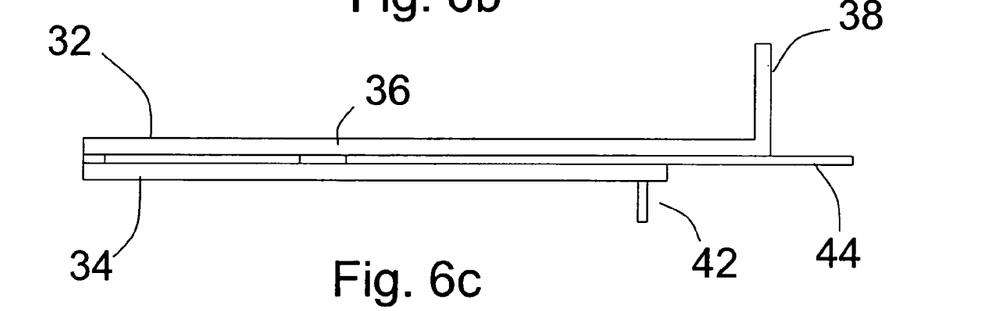
FIGS. 6c and 6d are a side plan view and a rear plan view, respectively, of an alternate embodiment of the elongated flange for use with an electric-powered light in accordance with the present invention.
Figure 6D:
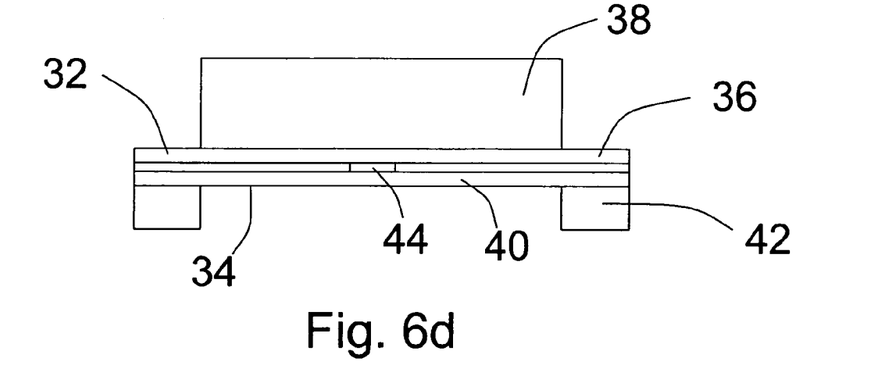

With reference to FIGS. 6c and 6d, an alternate embodiment of the electric-powered version of lighting system 1 includes a support flange with a two piece construction. The support flange of this embodiment includes a first portion 32 and a second portion 34. First portion 32 includes a body portion 36 and a coupling member 38 extending substantially perpendicular from body portion 36. Second portion 34 includes a body portion 40 and a stop member 42 extending substantially perpendicular to body portion 40. Stop member 42 and coupling member 38 extend in directions that are opposite from one another. First portion 32 and second portion 34 are configured to sandwich a wire 44 and are fixedly secured to each other using a glue, solvent, bolts, nails or any other suitable means for securing. Wire 44 may then be operatively coupled to the light source (not shown) to provide power to the light source.

With reference to FIGS. 7a-7d, an alternate embodiment of the present invention includes an extension member 46.

Figures 7A, 7B:
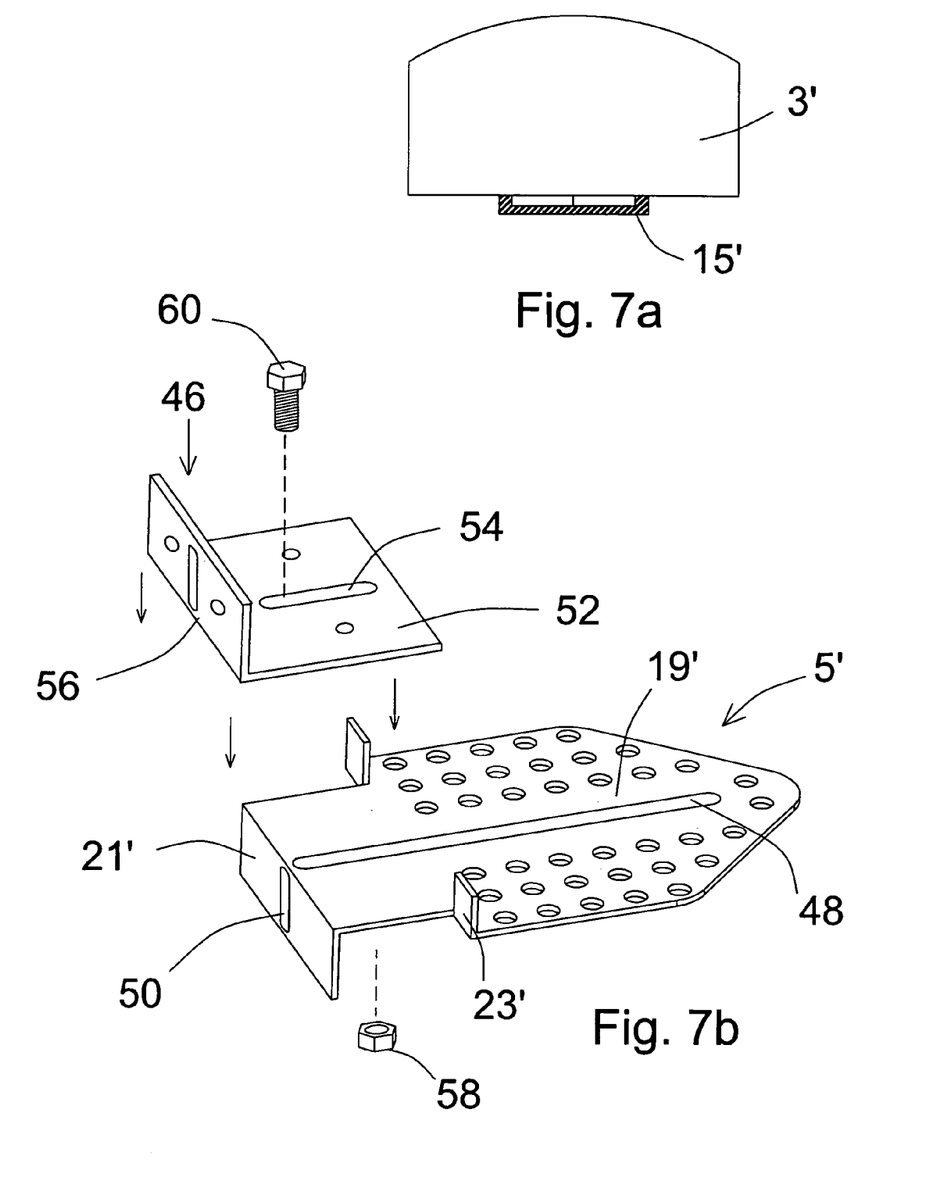
FIG. 7a is a top plan view of an alternate embodiment of a lighting fixture of a lighting system in accordance with the present invention.
FIG. 7b is an exploded perspective view of a lighting system utilizing an extension member in accordance with the present invention.

A lighting system includes a light fixture 3' with a bracket 15' attached thereto. Bracket 15' is configured to interact with coupling member 21' of elongated flange 5'. Elongated flange 5' includes a body portion 19' with a coupling member 21' extending substantially perpendicular thereto. Body portion 19' further includes a stop member 23' extending substantially perpendicular thereto, but in a direction opposite to coupling member 21'. Body portion 19' of elongated flange 5' further includes an elongated channel 48. Coupling member 21' also includes a channel 50. Extension member 46 includes a body portion 52 with a channel 54 and a securing member 56 designed to interact with bracket 15' of light fixture 3'. Extension member 46 may be formed from clear plastic or the like. Extension member 46 can be secured to elongated flange 5' in a variety of manners, for a variety of different purposes using a nut 58 and bolt 60. A first purpose of extension member 46 is to allow light fixture 3' to be positioned a greater distance away from a structure. When used in this manner, extension member 46 is secured in the manner illustrated in FIG. 7b. Bolt 60 is passed through channel 54 in body portion 52 of extension member 46. Bolt 60 is then passed through channel 48 in body portion 19' of elongated flange 5' and secured using nut 58. Before tightening nut 58 extension member 46 may be swiveled to either the right or left to provide light in a different direction. This swiveling action is particularly advantageous when elongated flange 5' is positioned at the corner of a structure. Bracket 15' of light fixture 3' is then attached to securing member 56.

Extension member 46 may also be configured for use in the ground to provide lighting to driveways, sidewalks, steps, yards, landscapes and the like. When used in this manner, bolt 60 is passed through channel 54 in body portion 52 of extension member 46. Bolt 60 is then passed through channel 50 in coupling member 21' and secured using nut 58. Bracket 15' of light fixture 3' is then attached to securing member 56. In this manner elongated flange 5' may be inserted into the ground or positioned on stairs. A sleeve (not shown) with the same general shape as elongated flange 5' may be positioned in the ground before elongated flange 5'. Then elongated flange 5' can be positioned within the sleeve. The use of such a sleeve allows the user to remove the elongated flange 5' in order to mow the lawn or perform some other task without losing the place where elongated flange 5' and light fixture 3' were positioned. The sleeve may be constructed from any suitable metallic or plastic material.

Figure 7C:
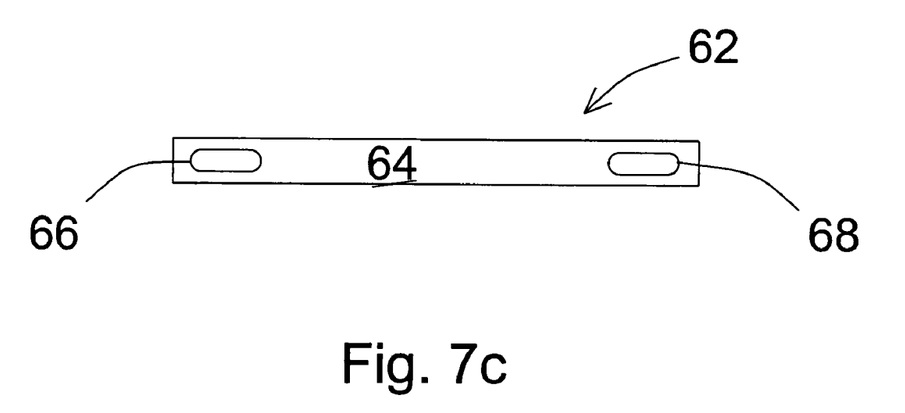
FIG. 7c is a top plan view of a lengthening member for use with the embodiment of FIG. 7b.
Figure 7D:
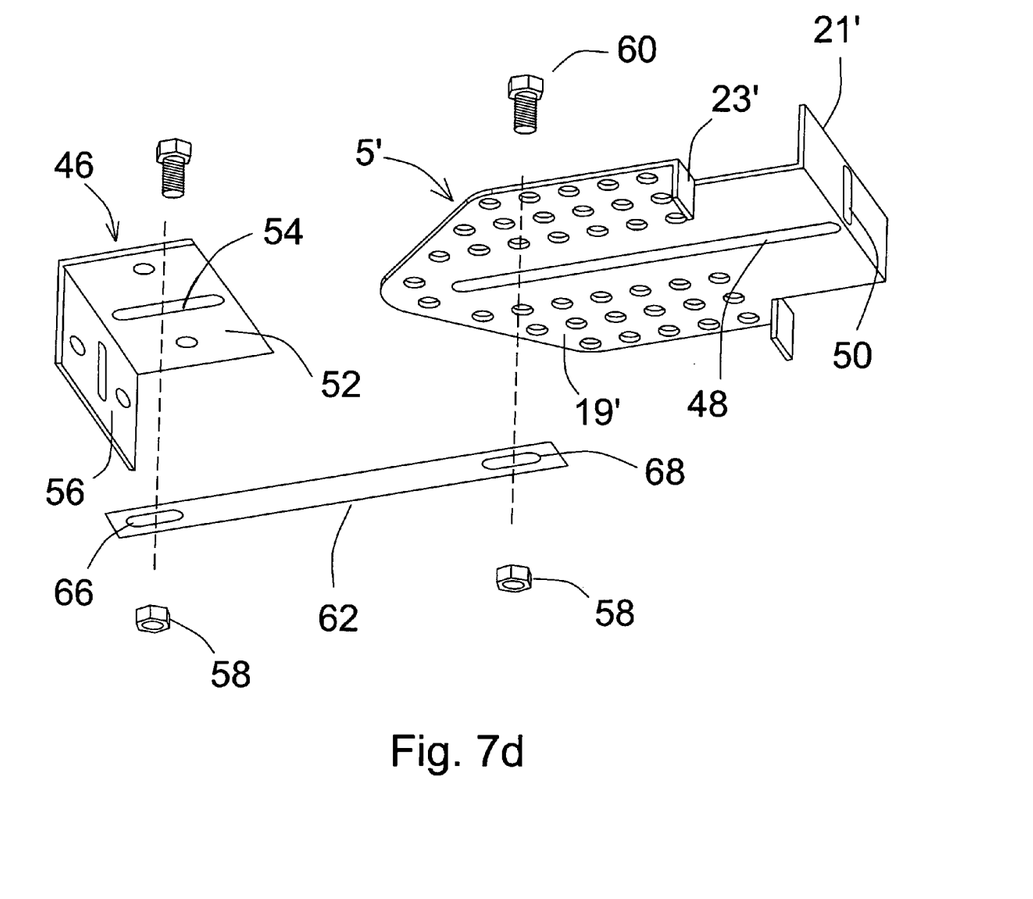
FIG. 7d is an exploded perspective view of a lighting system utilizing both an extension member and a lengthening member in accordance with the present invention.
Figure 7E:
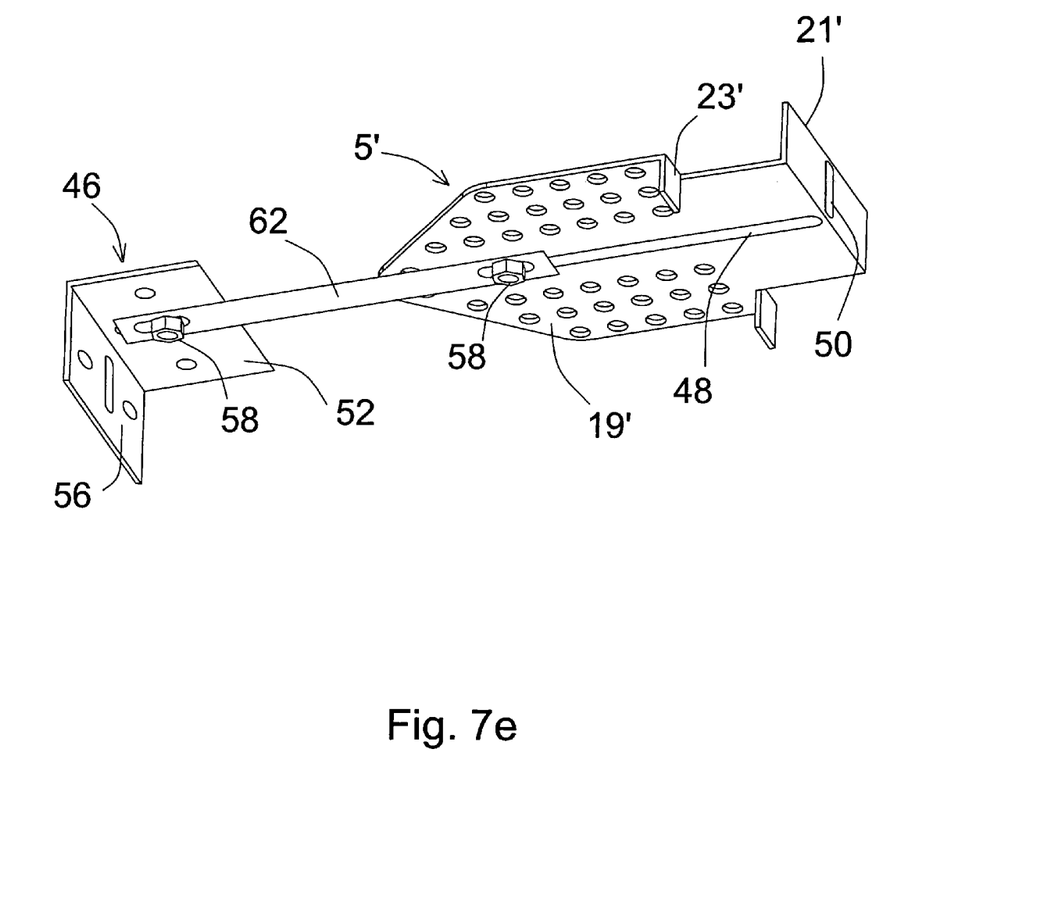
FIG. 7e is an assembled perspective view of FIG. 7d.

Finally, referring to FIGS. 7c-7e, extension member 46 may also be configured for use with a lengthening member 62 to allow the lighting system to be secured to the top of a wall, a rock cap or the like. Lengthening member 62 is a single piece of material, such as plastic, metal or the like, and includes a body portion 64 with a first hole 66 and a second hole 68. In use, second hole 68 of lengthening member 62 is secured to channel 48 in body portion 19' of elongated flange 5' a bolt 60 and a nut 58. Next, first hole 66 of lengthening member 62 is secured to channel 54 in body portion 52 of extension member 46 using a bolt 60 and a nut 58 such that securing member 56 of extension member 46 is parallel to stop member 23' of elongated flange 5' as illustrated in FIG. 7d. The lighting system can then be secured to the top of a wall or rock cap by positioning the top of the wall or rock cap between stop member 23' of elongated flange 5' and securing member 56 of extension member 46. Bracket 15' of light fixture 3' is then attached to coupling member 21' of elongated flange 5'.

Figure 8:
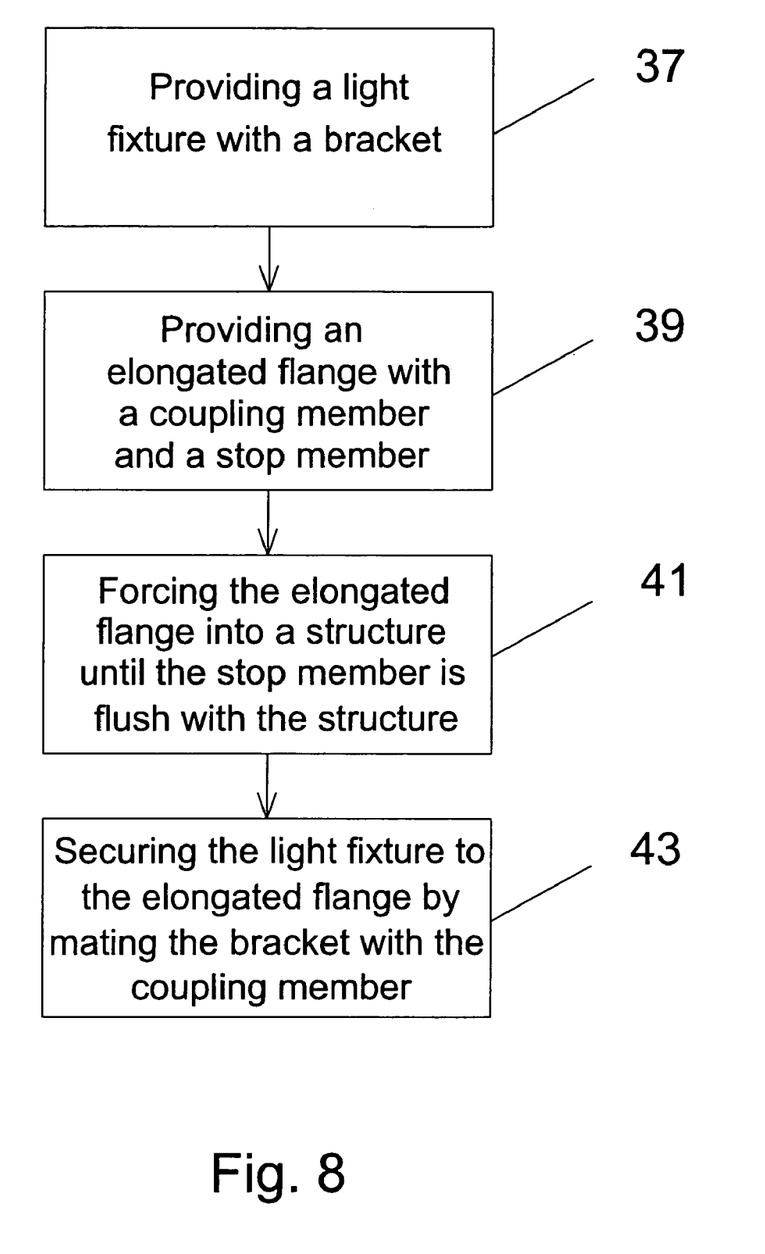
FIG. 8 is a flow-diagram of a method of installing a lighting system in accordance with the present invention.

With reference to FIG. 8, the present invention is also a method of installing a lighting system. First, a light fixture with a bracket attached thereto is provided (step 37). Next, an elongated flange including a body portion, a coupling member and a stop member is also provided (step 39). The coupling member is configured to mate with the bracket of the light fixture extending from the body portion. The stop member extends substantially perpendicular to the body portion. At this point, if an electrically powered light is used as described with reference to FIGS. 6a and 6b above, a hole should be drilled near the position where the elongated flange is planned to be forced into a structure. This step will prevent damage to the wiring of the electrically powered light. The next step of installing the lighting system is forcing the elongated flange into a structure until the stop member is flush with the structure (step 41). The elongated flange may be forced into the structure by hand, using a mallet or hammer, or through the use of any other suitable tool. The structure may be a stone or wood wall or the ground near steps, sidewalks, driveways or the like. Finally, the light fixture is secured to the elongated flange by mating the bracket with the coupling member (step 43). If a different position is desired for the lighting system within the structure, the lighting system can be easily moved and repositioned. First, the light fixture is removed from the elongated flange. Next, a screwdriver or other suitable tool is used to pry the flange from within the structure.

Many uses for the present invention are envisioned beyond the use in structures such as retaining walls or steps as described above in terms of the preferred embodiments. The present invention can be used between the boards of a wooden wall and also over the cement caps of a brick wall. The lighting fixture of the present invention can also be equipped with batteries and used when camping, on boats, under flower pots on porch walls, between stacks of lumber, and between boxes or books in storage rooms. The use of the present invention in a commercial environment has also been envisioned. A commercial embodiment of the present invention would be constructed using a larger, more powerful light source and a larger, more durable support flange. The elongated flange may also be permanently secured to a boating dock or other structure using nails, screws or the like. The user can then secure lights to the dock during the boating season. When the boating season ends, the user may remove the lights. Therefore, if the dock is damaged due to weather or any other type of accident, the user will only lose the inexpensive flange and not any of the lighting fixtures. Elongated flange 5 may also be used to support objects besides light fixture 3 such as, but not limited to, hanging plants.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:
1. A lighting system comprising:
a light fixture with a bracket attached thereto; and
an elongated flange comprising a substantially flat body portion, the body portion having a first end and a second end, a coupling member extending substantially perpendicularly from the first end of the body portion and at least one stop member extending substantially perpendicular from the first end of the body portion and opposite to the coupling member,
wherein the coupling member is adapted to interact with the bracket to secure the light fixture to the flange.

2. The lighting system of claim 1, wherein the light fixture is fixedly attached to the elongated flange.

3. The lighting system of claim 1, wherein the light fixture is removably attached to the elongated flange.

4. The lighting system of claim 1, wherein the body portion of the elongated flange includes a plurality of holes.

5. The lighting system of claim 1, wherein the lighting fixture has an elongated, hexagonal shape.

6. The lighting system of claim 1, wherein the lighting fixture is powered by solar cells, electricity, batteries or any combination thereof.

7. The lighting system of claim 1, wherein the elongated flange further includes a thin-channel for housing and protecting electrical wires.

8. A method of installing a lighting system, comprising the steps of:
providing a light fixture with a bracket attached thereto;
providing an elongated flange including a substantially flat body portion, the body portion having a first end and a second end, a coupling member configured to mate with the bracket of the light fixture extending substantially perpendicularly from the first end of the body portion and a stop member extending substantially perpendicular from the first end of the body portion and opposite to the coupling member;
forcing the elongated flange into a structure until the stop member is in contact with the structure; and
securing the light fixture to the elongated flange by mating the bracket with the coupling member.

* * * * *